United States Patent [19]

Whiteside, Jr.

[11] 4,173,947
[45] Nov. 13, 1979

[54] METHOD AND APPARATUS FOR REARING PIGS IN CAGES

[75] Inventor: John V. Whiteside, Jr., Nesmith, S.C.
[73] Assignee: John G. Wellman, Johnsonville, S.C.
[21] Appl. No.: 805,637
[22] Filed: Jun. 13, 1977
[51] Int. Cl.² .......................... A01K 1/00; A01K 1/02
[52] U.S. Cl. ...................................... 119/18; 119/16; 119/17; 119/20; 119/28
[58] Field of Search ...................... 119/18, 16, 17, 20, 119/22, 28

[56] References Cited

U.S. PATENT DOCUMENTS

| | | | |
|---|---|---|---|
| 2,697,413 | 12/1954 | Tharby | 119/17 |
| 2,736,291 | 2/1956 | Duff | 119/16 |
| 2,789,531 | 4/1957 | Diefendorf | 119/17 |
| 3,126,866 | 3/1964 | Kubota | 119/18 |
| 3,244,147 | 4/1966 | Kogeichi et al. | 119/18 |
| 3,601,096 | 8/1971 | Rutherford | 119/16 X |
| 3,815,549 | 6/1974 | Opmeer | 119/17 |

*Primary Examiner*—Louis G. Mancene
*Assistant Examiner*—Daniel J. Leach
*Attorney, Agent, or Firm*—Bell, Seltzer, Park & Gibson

[57] ABSTRACT

An efficient and highly productive method for rearing pigs wherein successive litters of pigs are placed in an enclosed building within a series of cages following weaning, the cages having floors of openwork construction to allow animal waste to pass therethrough and to keep the pigs in a dry condition. The animal waste passing through the floors of the cages is collected in an underlying trough where it is readily accessible for periodic inspection to locate any unhealthy pigs and thereby facilitate segregating them from the healthy pigs. Several times a day a sweeping flow of water is directed along the trough to flush away the animal waste from below the cage.

The cages are arranged in the building end-to-end in vertically aligned tiered relation to form respective upper and lower elongate series of cages, with each cage comprising a floor of openwork construction and an open-bottomed enclosure also of openwork construction restingly positioned on and supported by the floor. A plurality of upright cage supports arranged in longitudinally spaced pairs on opposite sides of the cages supportively carry the respective floors of the cages, with respective upper and lower elongate troughs being positioned underlying the upper and lower elongate series of cages for receiving and collecting the animal waste passing through the floors of the cages.

41 Claims, 14 Drawing Figures

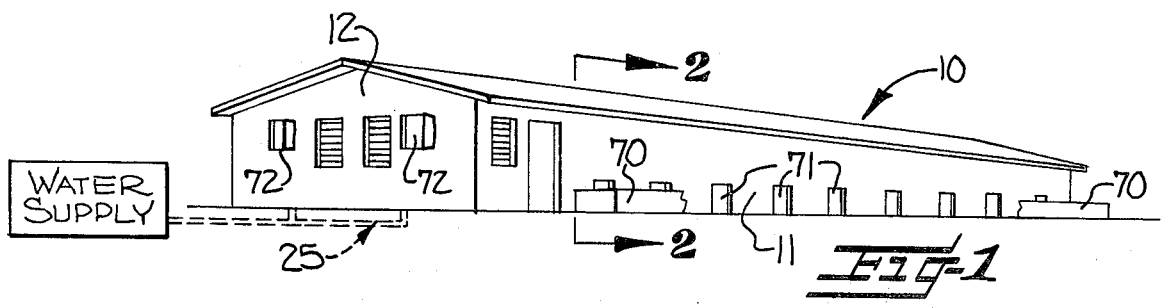
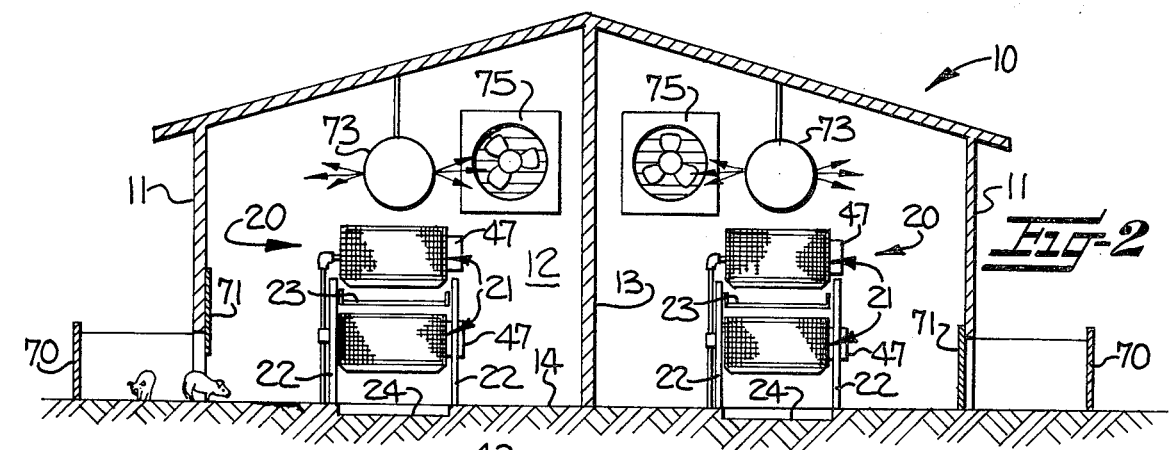
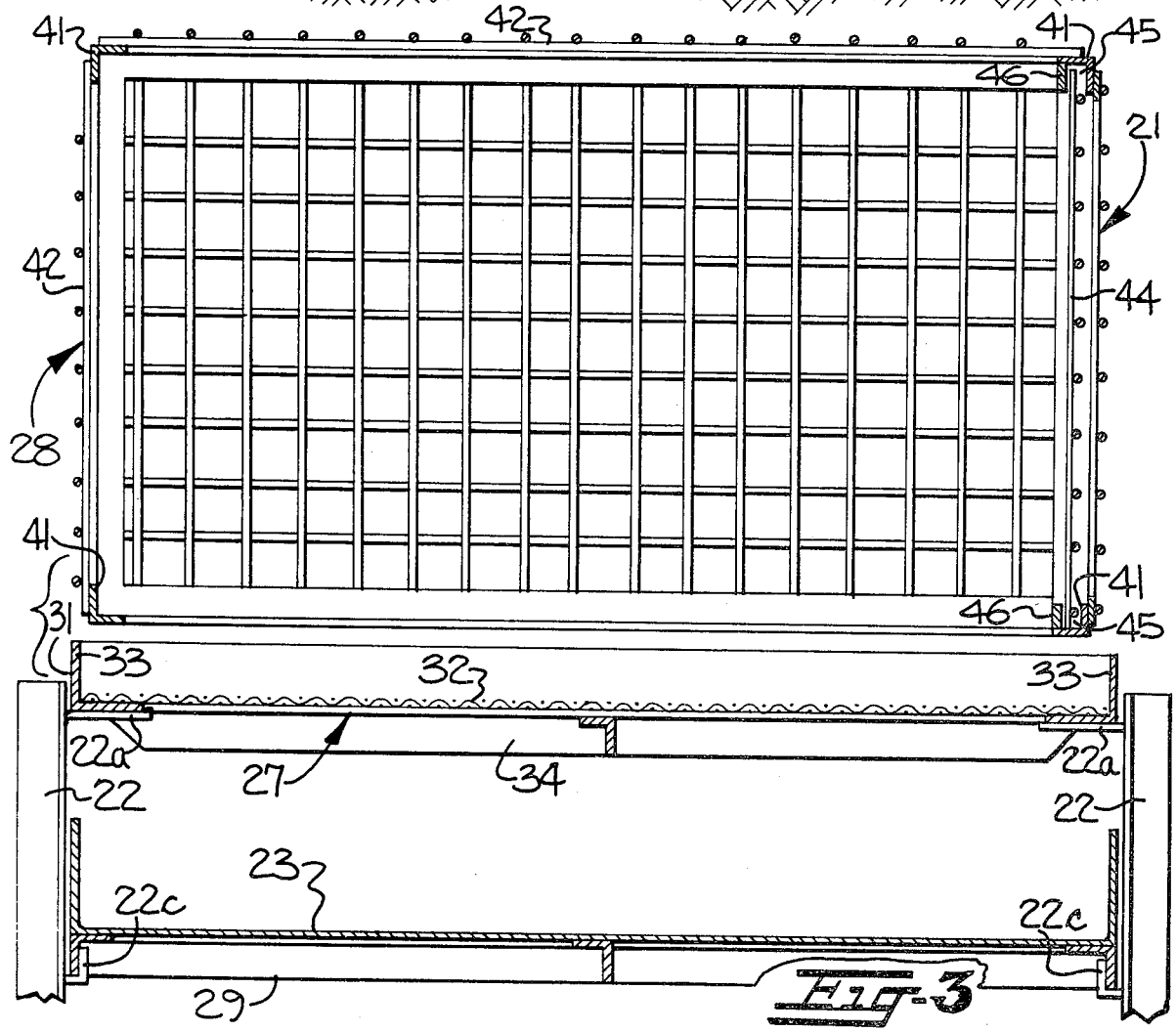

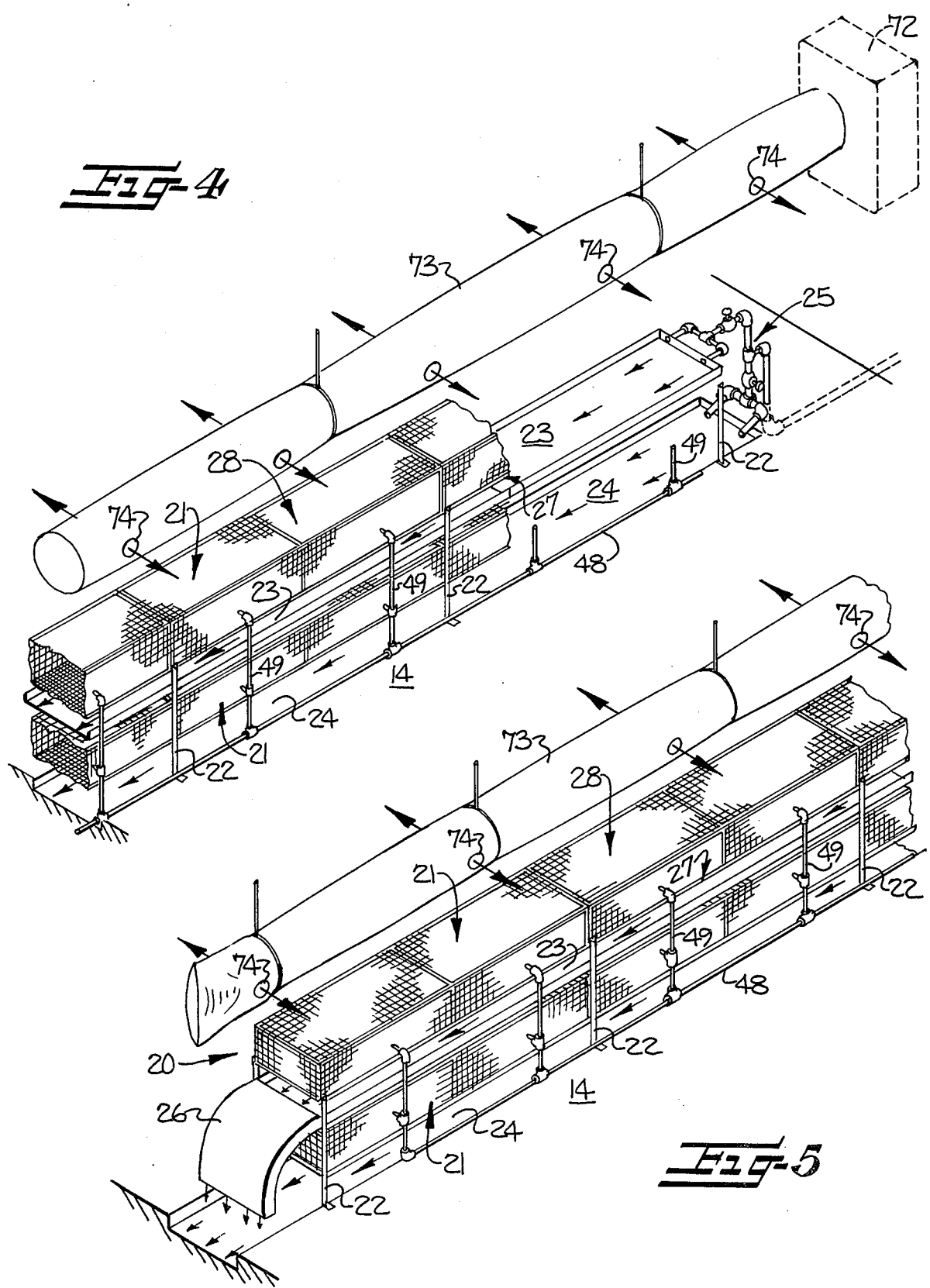

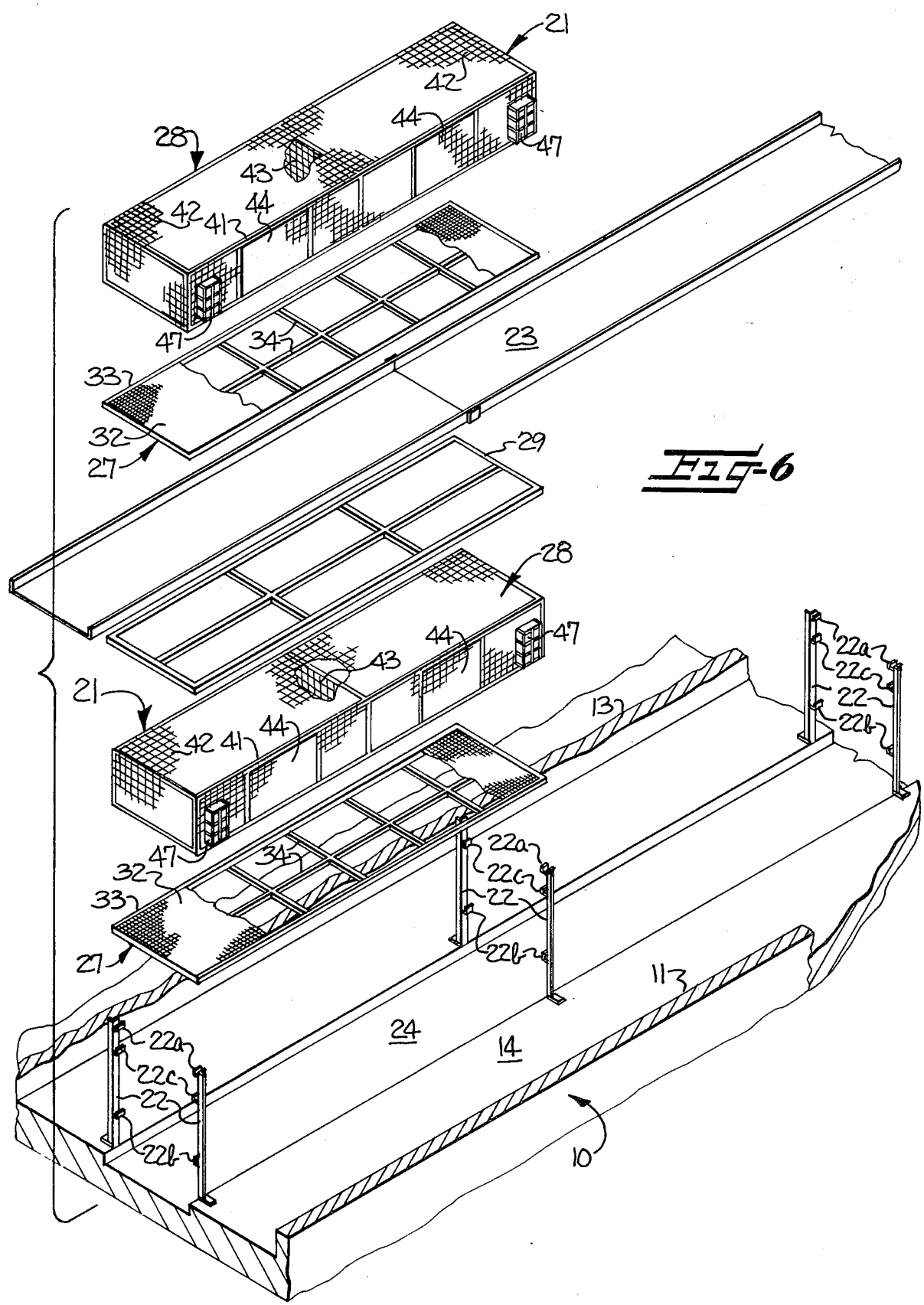

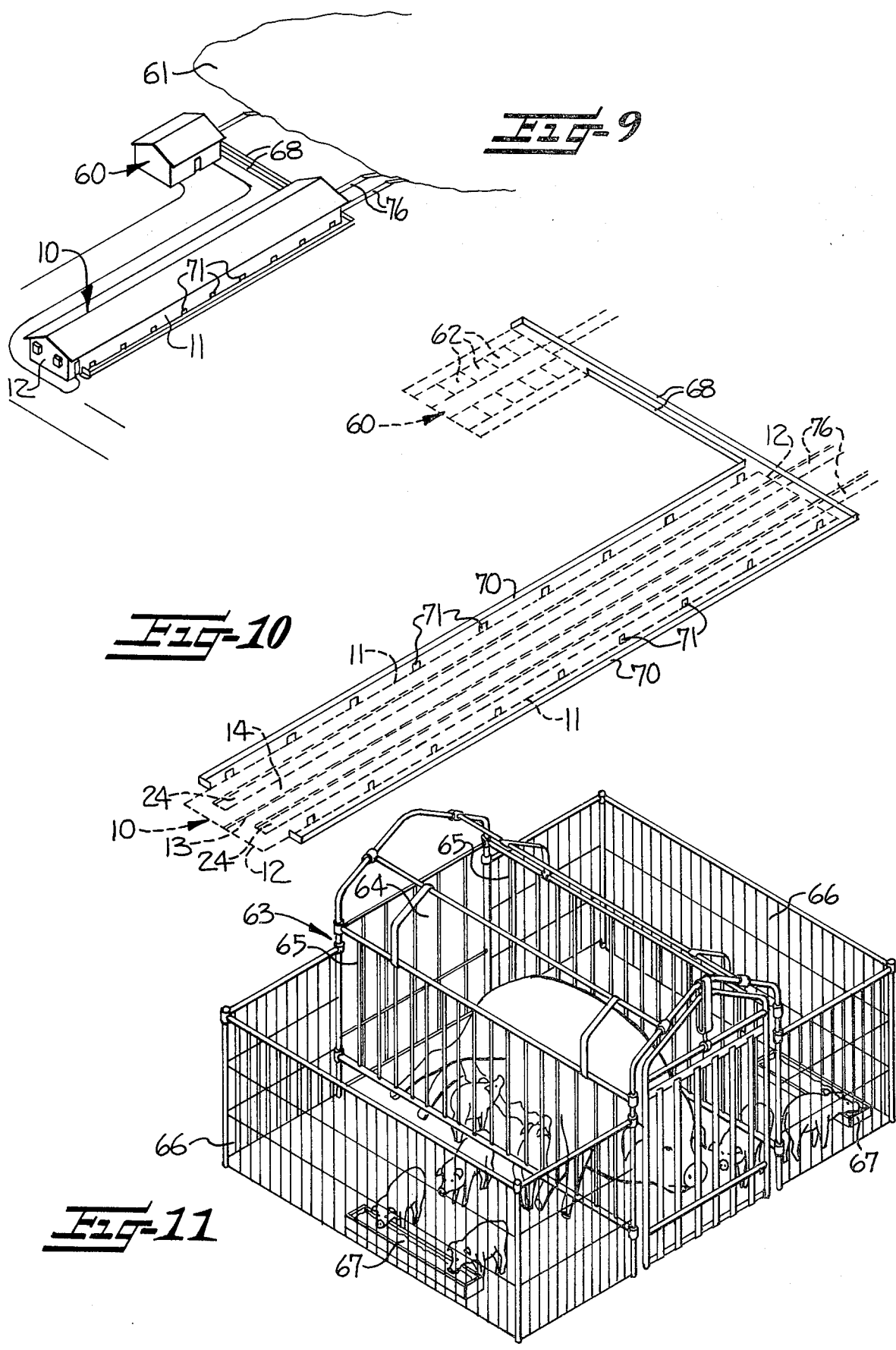

METHOD AND APPARATUS FOR REARING PIGS IN CAGES

BACKGROUND OF THE INVENTION

This invention relates to the rearing of animals, especially pigs, and more particularly to a method and apparatus wherein pigs are reared in cages.

While certain types of cage systems have been commercialized or proposed for rearing pigs, as shown for example in Biehl U.S. Pat. No. 3,380,438, as far as has been determined, cages have not been widely used for large scale production of pigs, and are most often used only in special circumstances, such as for orphans and sick pigs, for example. The previously proposed or commercialized cage systems of which applicant is aware are cumbersome and of complex construction and are not particularly suited for productive and efficient rearing of pigs on a large scale.

With the foregoing in mind it is an object of this invention to provide a method and apparatus for rearing pigs in cages in an efficient and highly productive manner.

It is a further object of this invention to provide an overall method particularly tailored to the rearing of pigs in cages.

It is another object of this invention to provide a method and apparatus for rearing pigs in cages which considerably reduces the amount of labor required in attending to the pigs.

It is a further object of this invention to provide a method and apparatus for rearing pigs in cages under conditions which enhance the general health and rate of growth of the pigs.

More particularly, it is an object of this invention to provide an overall system for rearing pigs in cages wherein such factors as temperature, humidity, feed and water supply, and waste removal are all carefully controlled and all contribute to providing a healthy environment conductive to good health and rapid growth of the pigs.

It is another object of this invention to provide a method and apparatus for rearing pigs under controlled conditions so that unhealthy pigs can be readily located and segregated from the healthy pigs to prevent the spread of disease or infection.

It is still another object of this invention to provide a method and apparatus of the type described wherein the mortality rate of the pigs after weaning is dramatically decreased.

It is a further object of this invention to provide a method and apparatus for rearing pigs wherein the condition of the sow is enhanced and wherein the sow is ready to be bred at an earlier time following birth of a litter of thereby increase productivity.

An additional object of this invention is to provide a cage construction particularly suited for the rearing of pigs therein and characterized by simple and economical construction.

Another object of the invention is to provide a cage of the type described which is particularly designed for the health and safety of the pigs housed therein.

It is a further object of the invention to provide a modular assembly of cages of the type described which may be easily installed within a confinement building of any desired dimensions.

It is a further object of the invention to provide a modular cage assembly of the type described further characterized by ease in loading and unloading pigs therefrom and designed to facilitate thorough cleaning of the cages following rearing of each group of pigs therein to prevent the spread of disease or infection.

SUMMARY OF THE INVENTION

The cages pursuant to the present invention have a floor of openwork construction to allow animal waste to pass therethrough while maintaining the animals in a dry condition, and an open-bottomed enclosure having side walls and a top wall also of openwork construction, the open-bottomed enclosure being restingly positioned on and supported by the floor with the floor thus serving as the bottom of the cage, and the enclosure having door means providing access into the cage for removing or placing animals in the cage.

The cages are arranged in vertically spaced tiered relation to form an upper and lower elongate series of cages, and are supported in this arrangement by a plurality of upright cage supports. More particularly, the floors of the respective cages are supported by the upright cage supports and the open-bottomed enclosures are restingly positioned upon the thus supported floors.

Respective upper and lower elongate troughs are provided underlying the upper and lower elongate series of cages and are positioned for receiving and collecting the animal waste passing through the floors of the cages while facilitating periodic inspection of the animal waste for locating any unhealthy animals and segregating them from the healthy animals. A water supply is provided at a corresponding end of the upper and lower elongate troughs for periodically directing a stream of wash water along the troughs to flush away the animal waste from below the cages.

In accordance with this invention the pigs are separated from the sow earlier than the conventional time for weaning and are thereafter placed in a confinement building with an elevated cage where a healthy environment particularly conductive to desirable development of the pigs is maintained.

While so-called "early weaning" has been previously proposed and has been practiced to some extent, the results have not always been satisfactory, primarily due to the undesirably high mortality rate of the pigs following weaning. In accordance with the present invention the pigs are weaned at the early age of about three weeks, which is considerably earlier than the conventional time for weaning which is normally from about four to five weeks to as late as seven to eight weeks. Yet, the mortality rate following weaning is lower even than the average rate for pigs weaned at the normal time.

The dramatic reduction in mortality rate in accordance with this invention is attributable to the way in which the pigs are treated both prior to and following weaning. More particularly, prior to weaning the pigs are provided with supplemental feed during at least the last half of the period of time they are with the sow, and preferably from about about the fifth day after birth. The supplemental feed is located accessible to the litter but inaccessible to the sow. By approximately the eighteenth to the twenty-first day, the pigs are fully accustomed to regular feed and are ready to be separated from the sow.

Weaning at the early age of about three weeks also results in reduced mortality while the pigs are with the sow. In this regard, the sow is a primary cause of death of the newborn pigs during this period, due to kicking or sitting upon the pigs, and the shortened duration of time with the sow considerably reduces the likelihood of such occurrences. Further, it has been found that the pigs gain weight faster when weaned earlier and provided with solid feed.

By weaning the litter from the sow at the early age of about three weeks in accordance with this invention, the amount of time which the sow nurses is relatively short, and the condition of the sow is thus enhanced. Further, the early weaning results in the sow being ready to be bred again at an earlier time, usually within about four days after separation of the sow from the litter.

Following weaning, the litter of pigs is placed in an enclosed building within an elevated cage. The cage is provided with a floor of openwork construction to allow animal waste to pass therethrough while maintaining the pigs in a dry condition. During the time that the pigs are maintained in the cage, the temperature and humidity conditions within the building are controlled and sufficient outside air is introduced into the building to replenish the oxygen supply and to remove odors. It has been determined that the temperature within the building should be desirably maintained within a range of about 78°-88°, and preferably about 82°-85° F. It has been found that by maintaining the temperature within the building substantially constant while also keeping the pigs dry results in a noticeable reduction in sickness among the pigs.

The animal waste passing through the floor of the cage is collected in a trough positioned below the cage where it is readily accessible for periodic inspection so that unhealthy pigs may be readily located and segregated from the healthy pigs. Periodically, a sweeping flow of water is passed along the trough to flush away the animal waste from below the cage.

BRIEF DESCRIPTION OF THE DRAWINGS

Further objects, features and advantages of the invention will become apparent from the detailed description which follows, when taken in connection with the accompanying drawings, in which FIG. 1 is a perspective view of a confinement house of a type suitable for use in accordance with this invention;

FIG. 2 is a cross-sectional view of the confinement house taken substantially along the line 2—2 of FIG. 1 and showing the longitudinally extending cage assemblies located in each side of the building;

FIG. 3 is an enlarged detailed cross-sectional view of one of the upper cages, and shown with the open-bottomed cage enclosure raised from the floor for clarity of illustration;

FIGS. 4 and 5 are fragmentary perspective views showing opposite end portions of a series of tiered cages;

FIG. 6 is an exploded perspective view showing the various components of the tiered cage assembly;

FIG. 9 is a perspective view showing the confinement building and an adjacent farrow building;

FIG. 10 is a view corresponding to FIG. 9 but with the confinement building and farrow building removed to more clearly illustrate the enclosed runs provided for directing the pigs from the farrow building to the confinement building;

FIG. 11 is a perspective view illustrating a farrow crate of the type which may be used in the farrow building;

DESCRIPTION OF THE PREFERRED EMBODIMENTS

Figures 7, 8:
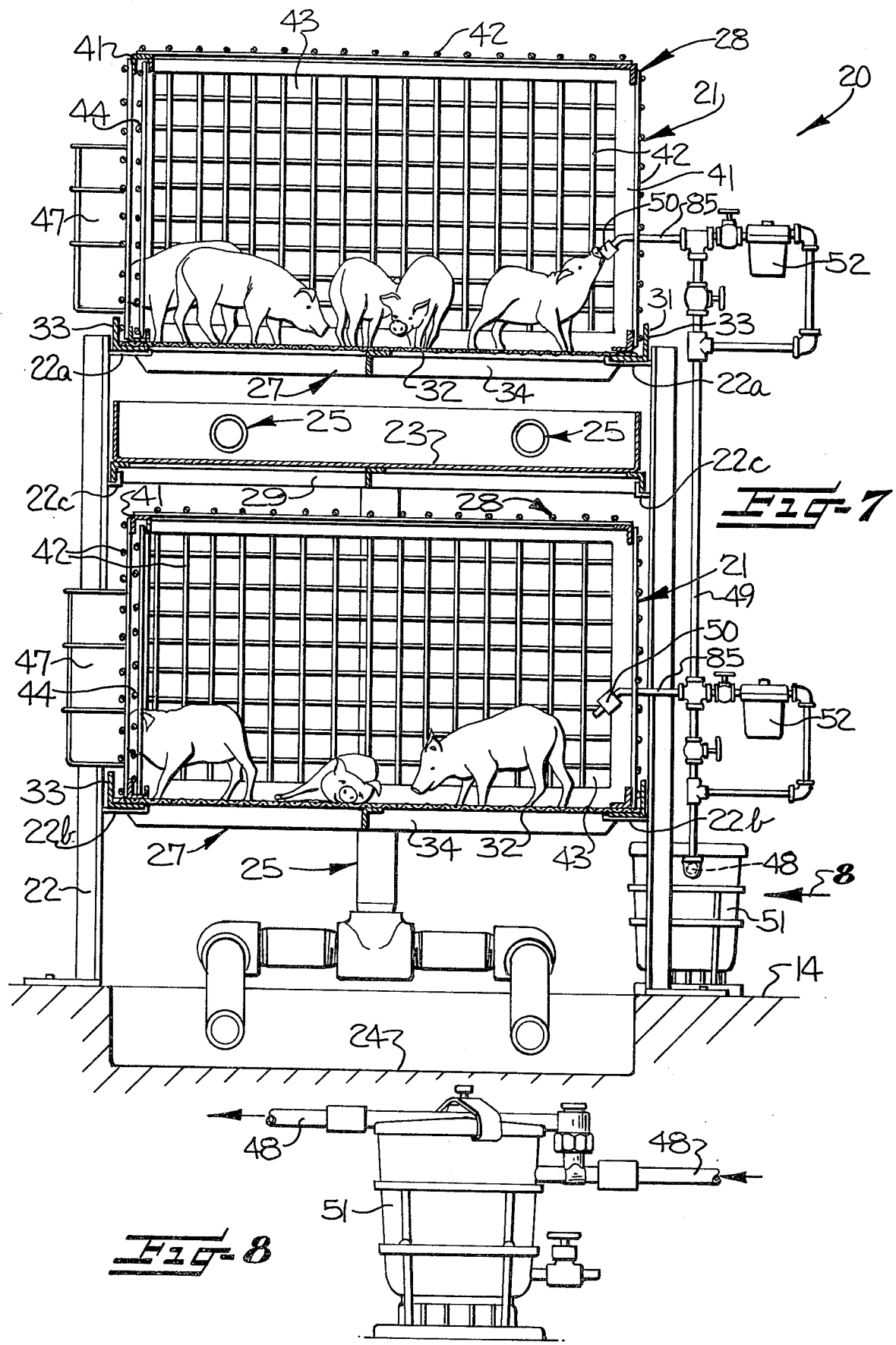
FIG. 7 is a cross-sectional end view of the tiered cage assembly.
FIG. 8 is a detailed elevational view of a medication dispenser as viewed from the arrow 8 in FIG. 7.

Referring now more particularly to the drawings for a better understanding of the invention, an elongate confinement building 10 is shown in FIGS. 1 and 2, the building having opposing pairs of elongate side walls 11 and end walls 12. As best seen in FIG. 2, the building preferably also includes a central interior wall or partition 13 dividing the building into separate adjacent rooms so that the respective tiered cage assemblies provided therein are isolated from one another to prevent the spread of disease or infection. The tiered cage assemblies, generally indicated by the reference character 20, which are provided in each of the adjacent rooms of the building extend longitudinally of the building from adjacent one end of the building to the other.

As best seen in FIGS. 4 and 5, each tiered cage assembly 20 comprises a plurality of elongate cages 21 arranged end-to-end in vertically aligned tiered relation to form respective upper and lower elongate series of cages. The cages are supported in tiered relation by respective longitudinally spaced pairs of upright cage supports 22 secured to the underlying floor 14 by bolts or other suitable means. As illustrated, the upright cage supports are located along opposite sides of the cages and positioned adjacent opposite ends of each cage with each of the upright supports engaging and supportively carrying two adjacent cages in each of the upper and lower series of cages.

Upper and lower elongate troughs, 23 and 24 respectively, underlie the upper and lower series of cages and serve to receive and collect the waste deposited by the pigs housed in the cages. The troughs 23, 24 are sloped from one end thereof to the other, and water supply pipes 25 are provided at the upper end of the elongate troughs for directing a high volume sweeping flow of water into the troughs for flushing away the waste deposited therein. A hooded scoop 26 at the downstream end of the upper trough directs the flow of wash water downwardly and into the lower trough.

Referring more particularly to the troughs, as illustrated in FIGS. 4 and 5 for example, it will be seen that the upper trough 23 is supported beneath the upper series of cages by the upright cage supports 22. Upper trough 23 may be formed from any suitable watertight material such as sheet metal or fiberglass, for example. As illustrated, the lower trough 24 is defined by a recessed gutter formed in the floor 14 of the confinement building 10. Preferably, the floor 14 of the confinement building is formed of concrete and is sloped from one end of the building to the other to facilitate drainage when the entire floor of the building is periodically cleaned. By providing a slope to the entire floor 14, the recessed lower trough 24 may be of the same depth throughout the length of the building while maintaining the slope necessary for proper drainage of the wash water. Additionally, this construction permits using upright cage supports 22 of a similar height throughout the entire building while automatically providing the necessary slope for the upper trough 23 which, as noted earlier, is supported by the upright cage supports 22.

Referring now to FIG. 6, each of the cages 21 in the tiered cage assembly includes an elongate rectangular floor member 27 and a cooperating elongate rectangular open-bottomed enclosure 28. Corner portions of the respective floor members 27 of the upper and lower series of cages are supportively carried by respective upper and lower cage support brackets 22a, 22b provided on each of the cage supports 22. The open-bottomed enclosures 28 in turn are restingly positioned on and supported by the respective floor members 27 with the floor members thus serving as the bottoms of the cages. The cage supports 22 also include trough support brackets 22c located between and upper and lower cage support brackets 22a and 22b which extend inwardly toward one another and supportively carry a skeletal trough support frame 29. Upper trough 23, in turn, in supportively carried by the trough support frame 29. Thus it will be seen that the entire cage assembly is of modular construction and any number of successive cages may be installed in the series depending upon the length of the confinement building.

Both the floor member 27 and the open-bottomed enclosure 28 are of openwork construction to provide for unimpeded circulation of air throughout the cages while allowing waste deposited by the pigs to pass through the floor of the cage, thus keeping the pigs dry. In the preferred form of the invention illustrated herein, the openwork construction is comprised of open mesh wire, although it is contemplated that other types of openwork construction may be suitably employed. For example, spaced bars rather than wire mesh may be used for the side walls and top of enclosure 28.

Referring now more particularly to the details of the cage construction, as best seen in FIGS. 3 and 7, the floor member 27 of each cage includes a skeletal reinforcing frame 31 which is carried by the cage support brackets 22a or 22b with open mesh wire 32 overlying the skeletal frame and defining the flooring of the cage. As illustrated, the perimeter of the skeletal frame 31 includes an upstanding flange portion 33. In the construction illustrated, the skeletal reinforcing frame 31 is formed of angle iron and the upstanding flange portion 33 comprises one of the legs of the angle iron with the other leg of the angle iron serving for supportively carrying the open mesh wire 32. The skeletal reinforcing frame 31 also includes reinforcing cross-members 34 (FIG. 6) which further serve to reinforce the frame 31 and to support the open mesh wire 32 thereon.

The open-bottomed enclosure 28 also has a skeletal reinforcing frame, defined by angle iron members 41. Open mesh wire 42 defining the top and sides of the enclosure is secured to the angle iron members 41 by suitable means such as welding. As illustrated, the open mesh wire 42 of the enclosure is of larger mesh size than the wire 32 defining the flooring of the cage. Preferably, the wire 32 defining the flooring of the cage has mesh openings of no more than about a half inch, to adequately support the feet of small pigs housed therein, while the wire 42 of the sides and top of the enclosure may have openings as large as about two inches. The wire 42 is secured to the outside of the reinforcing frame so that any rough edges of the wire are outside of the cage and are shielded from contact by the animals housed therein. As illustrated, lowermost portions of the side walls of the enclosure 28 are positioned inside the upstanding flange portion 33 of the floor with the flange portion thus serving for retaining the enclosure in position resting upon the floor. Each enclosure 28 also includes a partition 43 formed of open mesh wire of a type similar to that forming the top and sides of the enclosure. Partition 43 is located in a medial portion of the elongate cage and divides the cage into a pair of adjacent compartments of similar size.

Respective doors 44 are provided along a side wall of the enclosure to provide access into each of the adjacent compartments of the cage for removing or placing animals therein. Preferably, and as illustrated, the doors 44 are of the sliding type and are mounted for sliding movement along a common side wall of the enclosure. More particularly, the doors 44 are formed of open mesh wire similar to the top and sides of the enclosure and are mounted for sliding movement along respective upper and lower trackways 45. As best seen in FIG. 3, a strip 46 is welded or otherwise suitably secured to an inner portion of the upper and lower angle iron members 41 along one side of the cage to thereby define the upper and lower trackways 45. The respective sliding doors 44 for each of the adjacent compartments are positioned in the same trackways 45, with the doors being so located in the side wall as to be positioned in spaced relation from one another alongside the respective compartments of the cage when the doors are closed, and each door being slidably positionable alongside the adjacent compartment of the cage when in opened relation. This mounting arrangement for the doors causes the doors to be positioned out of the way when in opened relation to provide ready access into the cage.

In the preferred embodiment of the invention illustrated, each cage has an overall length of about twelve feet, with each cage compartment being about six feet long by about three feet wide and about twenty inches high. This size, together with the sliding mounting for the doors, enables the person unloading the cage to reach all corners of the cage to grasp and remove the pigs from the cage.

Each cage is provided with a feed dispenser 47, which as illustrated includes a wire mesh holder mounted on an exterior wall of the cage with a feed container positioned in the holder and with an opening being formed in the side wall of the cage to provide access to the container. The feed container may be refilled manually, or if desired a suitable automated feed conveyor arrangement can be employed. The cage also includes a drinking water supply on the side wall of the cage opposite the feed dispenser. As illustrated, the drinking water supply includes a pipe 48 extending longitudinally of the series of cages with risers 49 extending upwardly alongside each compartment of the upper and lower series of cages. An animal actuated water dispenser nipple 50 is mounted inside each compartment for supplying drinking water to the animals housed therein.

If desired, a medication dispensing system may be associated with the water supply. As shown in FIGS. 7 and 8, a primary medication dispenser 51 is connected to the water supply pipe 48 and may be operated when it is desired to supply medication to the entire series of cages. Additionally, individual medication dispensers 52 are connected to the riser pipe 49 of certain of the cages in order to permit selectively and individually dispensing medication in the water supply of those particular cages wherein sickly or unhealthy pigs may be housed.

In accordance with the method of this invention each pregnant sow, shortly before delivery of a litter, is placed in a confining farrow crate normally located within a separate farrow building. As shown in FIGS. 9 to 11, the farrow building 60 is located adjacent to the confinement building 10 with a nearby lagoon 61 being adapted for receiving the pig waste flushed from the farrow building 60 and the confinement building 10. As shown in FIG. 10, the farrow building 60 has a series of stalls 62 therein in which farrow crates of the type generally indicated in FIG. 11 by the reference character 63 are provided.

As conventionally constructed, the farrow crate 63 has a centrally located sow confinement area 64 having sufficient room for the sow to move forward and backward therein and to lie down but which provides insufficient room for the sow to turn around. Fences 65 provided along each side of the sow confinement area are elevated above floor level a distance sufficient to permit the litter of pigs to move from the sow confinement area 64 to piglet confinement areas 66 alongside each side of the row. Supplemental food 67 is provided in the piglet confinement areas 66 so as to be accessible to the litter but inaccessibly located to the sow. Thus the litter of pigs have access to the sow for nursing and also have access to the supplemental food 67.

Supplemental food is provided to the pigs during at least the last half of the period of time they are with the sow, and preferably from about the fifth day after birth. By providing supplemental food to the litter of pigs at the early age of about five days, the pigs become accustomed to regular feed earlier and are thus ready to be weaned from the sow at an earlier age.

The pigs are weaned at about three weeks, which is considerably earlier than the age at which weaning is normally performed. Preferably in accordance with this invention the pigs are separated from the sow prior to the age of three weeks, most desirably from about the eighteenth to the twenty-first day. It has been found that the pigs develop more rapidly and gain weight faster when they are weaned earlier and provided with solid food. Further, by minimizing the time which the pigs are with the sow, mortality of the pigs during this period is significantly reduced. The sow commonly causes death of her newborn pigs by biting, kicking or sitting upon the pigs, and it will be readily appreciated that removing the pigs from the sow earlier reduces the likelihood of this type of death.

The earlier weaning also benefits the sow. The reduced time of nursing enhances the condition of the sow by conserving the sow's body weight. Further, overall production is increased since the sow is ready to be bred again earlier, usually within about four days after removal of the sow from the litter.

Upon removal of the litter of pigs from the sow, the pigs are directed from the farrow building 60 to the confinement building 10. To facilitate movement of the pigs from the farrow building 60 to the confinement building 10 a pair of relatively short barriers or fences 68 is provided extending from the farrow building 60 to the confinement building 10, and similar relatively short barriers 70 are provided extending alongside the opposing side walls 11 of the confinement building. The barriers 68 and 70 thus define an elongate runway along which the pigs may be herded from the farrow building 60 to the confinement building 10. Relatively small pig entrance doors 71 are provided at spaced locations along opposite side walls 11 of the confinement building and through which the pigs may be directed to facilitate loading them into the cages located inside the confinement building. The doors are preferably so located along the side wall 11 for serving adjacent pairs of cages within the building. In herding the pigs from the farrow building 60 to the confinement building 10 temporary barricades may be suitably located in the runway adjacent to the particular door 71 through which the pigs are to be directed to thereby facilitate directing the pigs through the appropriate door. Once inside the building, the pigs are manually loaded into the cages preferably in groups of no more than about twelve pigs in each cage compartment.

The pigs are desirably maintained in the cage for a period of about three weeks from an initial weight of about twelve to fifteen pounds to a final weight of about twenty to thirty pounds. During this time, conditions within the confinement building are very carefully controlled to maintain a very healthy environment for the pigs conducive to healthy and rapid development and weight gain. In this regard, the temperature in the building is maintained within the range of about 78° to 88° F., and most desirably at a substantially constant level about 82° to 85° F. Humidity conditions are also preferably maintained at a relatively high level of about sixty percent (RH) or greater.

Temperature and humidity control is suitably maintained by at least periodically introducing outside air into the building through a ventilation system. The ventilation system of the preferred form of the invention illustrated in FIGS. 2, 4 and 5 includes a fan 72 provided at one end of the elongate building with an elongate duct 73 formed of plastic or other suitable material extending longitudinally of the building above the elongate series of cages. Openings 74 are provided in the sides of the duct at spaced locations therealong for directing the air laterally toward the sides of the building forming a gentle curtain of air sweeping downwardly along the sides of the building and then inwardly toward the cages. This arrangement avoids directing unhealthy drafts upon the pigs in the cages. The ventilation system additionally includes supplemental ventilating fans 75 suitably positioned for example in one end wall 12 of the building. The supplemental fans 75 are thermostatically controlled to come into operation when the temperature within the building exceeds a predetermined level to thereby provide an increased level of ventilation within the building serving to maintain the temperature within the building at a desired level.

As noted earlier, the waste deposited by the pigs confined in the cages passes through the open mesh floor of the cages and is collected in the upper and lower elongate troughs 23 and 24. These troughs are so positioned beneath the cages that the collected waste is readily accessible for inspection. Periodically, the waste is inspected to locate any unhealthy pigs and thereby facilitate segregating them from the healthy pigs. In this regard, those familiar with pig production are aware that a common and very menacing disease among pigs is "scours", which is somewhat similar to dysentery in humans and which is evidenced by thin, watery or whitish excrement. By confining the pigs in small groups in cages, and by periodically inspecting the waste of the pigs, the presence of scours among the pigs can be readily identified and appropriate corrective measures taken.

In this regard, it is the preferred practice in accordance with this invention to remove sickly or unhealthy pigs from the cages where healthy pigs are confined and segregating the unhealthy pigs in another cage isolated from the healthy pigs. Most desirably, the unhealthy pigs are segregated in a cage located at one end of the elongate series of cages and downwind and downstream of the healthy pigs. This assists in preventing the spread of disease to the healthy pigs. Medication may be supplied to these unhealthy pigs in the drinking water, preferably using an individual medication dispenser 52 of the type shown in FIG. 7. The individual medication dispensers can be selectively used in those cages where needed, while the remaining cages of the series receive ordinary drinking water. In the event that it becomes necessary to supply medication to all of the cages, a primary medication dispenser 51 may be actuated to proportion medication into the drinking water supply for all of the cages.

Periodically, preferably several times a day, the valves in the flush water supply pipes 25 are opened and the accumulated waste in troughs 23 and 24 is flushed from the troughs and directed out of the confinement building 10. As illustrated in FIG. 9, a lagoon 61 may be suitably located near the confinement building 10, and the flush water and waste may be directed from the building 10 and into the lagoon 61 along a suitable channel 76.

Figure 12:
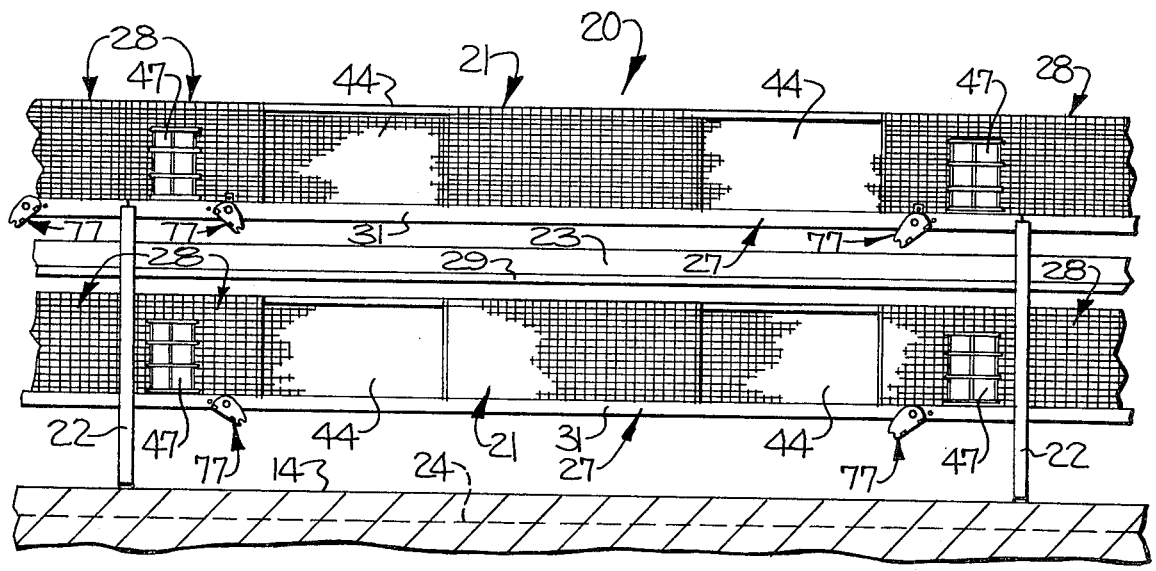
FIG. 12 is a side elevational view of the tiered cage assembly and illustrating the provision of a lifting device to facilitate raising the open-bottomed enclosure out of resting engagement with the floor for cleaning.
Figures 13, 14:
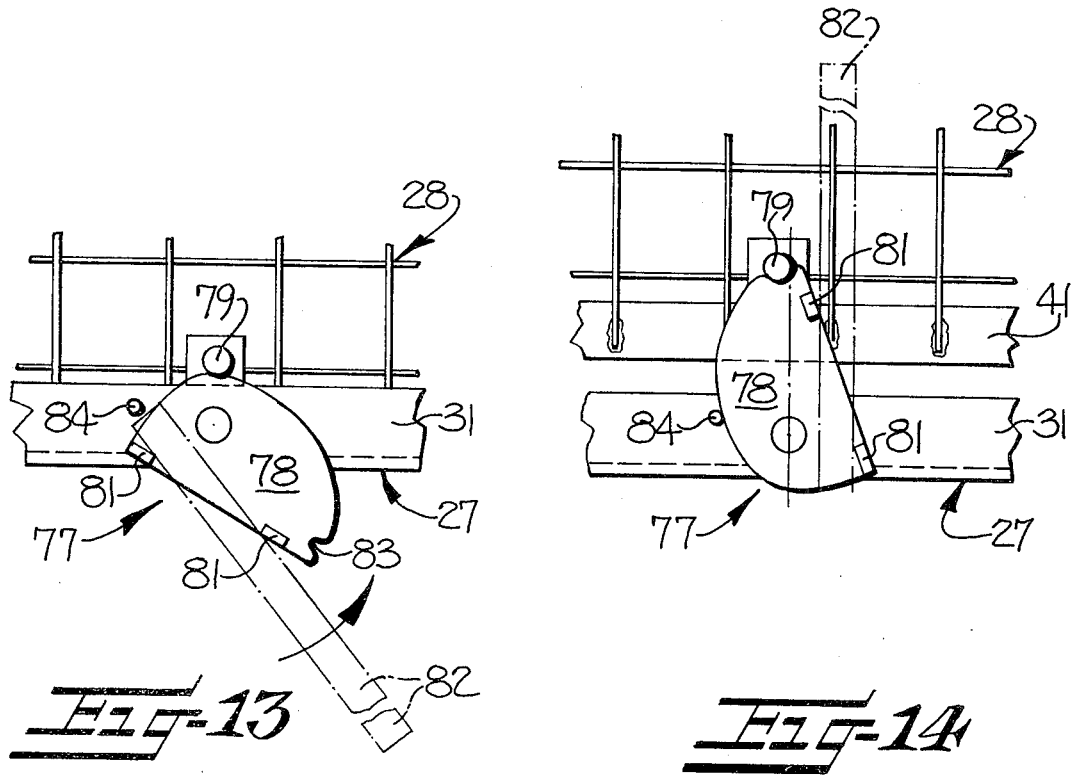
FIGS. 13 and 14 are detailed views of the lifting device shown in the lowered and raised positions respectively.

After the pigs have been removed from the cages and prior to placing additional groups of pigs into the cages it is desirable that the cages be thoroughly cleaned using a high pressure spray of water. To facilitate thorough cleaning of the cages, the open-bottomed enclosure 28 may be raised out of resting engagement with the floor member 27. To assist in raising the cages for cleaning, a manually actuable lifting device 77 may be provided adjacent each corner of each cage as shown in FIG. 12. The lifting device 77, as illustrated in more detail in FIGS. 13 and 14, includes a cam 78 mounted for pivotal movement on the skeletal reinforcing frame 31 of the floor member 27 of the cage. A pin 79 mounted on the lowermost angle iron member 41 of the enclosure 28 extends outwardly from the enclosure and engages the surface of cam 78. Outwardly extending tabs 81 formed in the cam 78 are adapted for removably receiving an elongate bar or lever 82 which may be utilized for moving the cam from the position shown in FIG. 13 in which the enclosure is in the normal lowered position to the raised position indicated in FIG. 14. A notch or recess 83 provided in the cam 78 serves to maintain the enclosure in the raised position, while a stop pin 84 mounted on the skeletal frame 31 of the floor member alongside the cam 78 serves to prevent rotation of the cam 78 beyond the position shown in FIG. 14. A flexible connector pipe 84 associated with the water supply nipple 50 is provided to accommodate vertical movement of the nipple 50 with movement of the enclosure 28 upon raising the enclosure for cleaning.

In the drawings and specification, there has been set forth a preferred embodiment of the invention, and although specific terms are employed, they are used in a generic and descriptive sense only and not for purposes of limitation.

That which is claimed is:

1. A method of rearing hogs to increase the frequency of litters from each sow while enhancing the condition of the sow and reducing the mortality rate in each litter, said method comprising placing each pregnant sow prior to delivery of a litter in a confining farrow crate having sufficient room for the sow to move forwardly and backwardly therein and to lie down but insufficient room to turn around, maintaining the sow in the farrow crate after the birth of a litter for a period of time no longer than about three weeks while suckling the litter and, while during at least the last half of the period of time, providing supplemental food accessible to the litter but inaccessibly located to the sow, removing the sow and the litter from the farrow crate and separating the sow from the litter, placing the litter of pigs in an enclosed building within at least one elevated cage of openwork construction also having an openwork floor adapted to allow animal waste to pass therethrough while maintaining the pigs in a dry condition, maintaining the pigs within the cage while providing readily accessible food and water and while at least periodically introducing outside air into the building to replenish the oxygen supply therein and to remove odors, collecting the animal waste passing through the openwork floor of the cage in a trough positioned immediately below the cage, periodically passing a sweeping flow of water along the trough to flush away the animal waste from below the cage, and directing the animal waste and flush water to a collecting area outside the building.

2. A method according to claim 1 including periodically inspecting the readily accessible waste collected in the trough to locate any unhealthy pigs and thereby facilitate segregating them from the healthy pigs.

3. A method according to claim 1 including controlling the temperature in the building within the range of about 78° to 88° F.

4. A method according to claim 3 wherein the temperature within the enclosed building is maintained substantially constant at about 82° to 85° F.

5. A method according to claim 1 including providing the litter with supplemental food while in the farrow crate from about the fifth day after birth.

6. A method according to claim 1 including confining the pigs in the elevated cage in groups of no more than about twelve pigs per cage.

7. A method according to claim 1 including maintaining the pigs in the cage for a period of about three weeks.

8. A method according to claim 1 wherein the enclosed building in which the litter of pigs is placed within an elevated cage has a series of pig entrance doors extending along the side of the building and the enclosed building is located adjacent to a farrow building containing the farrow crates, and wherein the step of placing the litter of pigs in the enclosed building following removal from the farrow crate includes herding the pigs along a confining run connecting the farrow building with the enclosed building and along a confining run extending alongside the building and adjacent to the pig entrance doors, and successively directing the pigs of the litter through a predetermined one of the pig entrance doors and into the enclosed building to facilitate thereafter manually placing the litter within the elevated cage adjacent the pig entrance door.

9. A method of rearing pigs in cages comprising separating a litter of pigs from the sow and placing the pigs in an enclosed building within at least one elevated cage of openwork construction also having an openwork floor adapted to allow animal waste to pass therethrough while maintaining the pigs in a dry condition, maintaining the pigs within the cage while providing readily accessible food and water and while at least periodically introducing outside air into the building to replenish the oxygen supply therein and to remove odors, collecting the animal waste passing through the openwork floor of the cage in a trough positioned below the cage, periodically inspecting the readily accessible waste collected in the trough to locate any unhealthy pigs and thereby facilitate segregating them from the healthy pigs, periodically passing a sweeping flow of water along the trough to flush away the animal waste from below the cage, and directing the animal waste and flush water to a collection area outside the building.

10. A method according to claim 9 wherein the separating of the litter of pigs from the sow and confining the pigs within the cage is performed when the pigs are about three weeks of age and including maintaining the pigs in the cage for a period of about three weeks.

11. A method according to claim 9 including controlling the temperature in the building within the range of about 78° to 88° F.

12. A method according to claim 9 wherein a series of cages is provided in the enclosed building and said method including inducing a flow of air in the building longitudinally of the series of cages and removing any unhealthy pigs from the cages of the series and segregating the unhealthy pigs in the cage of the series located most downwind from the cages with the healthy pigs to thereby prevent spread of disease or infection by the unhealthy pigs to the healthy pigs.

13. A method according to claim 9 wherein a series of cages is provided in the enclosed building and said method including selectively incorporating medication into the water supply for any cage containing unhealthy pigs.

14. A method according to claim 9 including thoroughly cleaning the cage and the underlying trough upon removal of the pigs from the cage and prior to placing a subsequent group of pigs therein.

15. Apparatus for rearing animals in cages, and being especially suited for rearing pigs, said apparatus comprising an elongate confinement building, a plurality of elongate cages arranged end-to-end in tiered relation to form respective upper and lower elongate series of cages extending longitudinally within said confinement building, each cage comprising a floor of open mesh construction to allow animal waste to pass therethrough while maintaining the animals in a dry condition, and an open-bottomed open mesh enclosure restingly positioned on and supported by said floor with the floor thus serving as the bottom of the cage, said enclosure including a skeletal reinforcing frame and open mesh wire secured to the skeletal frame to define the top and sides of the enclosure, the wire being positioned exteriorly of the frame to locate any rough edges of the wire outside of the cage and shielded from contact by the animals housed therein, a plurality of upright cage supports at longitudinally spaced locations along the elongate confinement building and engaging and supporting the respective floors of the cages in said upper and lower series of cages, respective upper and lower elongate troughs underlying said upper and lower elongate series of cages and being positioned for receiving and collecting the animal waste passing through the floors of the cages while facilitating periodic inspection of the animal waste for locating any unhealthy animals and segregating them from the healthy animals, water supply means operably associated with a corresponding end of said upper and lower elongate troughs for periodically directing a sweeping flow of wash water along the troughs to flush away the animal waste from below the cages, means associated with corresponding opposite ends of said upper and lower elongate troughs for receiving the wash water and waste flushed from the troughs and for directing the same out of the confinement building, and ventilation means provided in said confinement building for at least periodically introducing outside air into the building to replenish the oxygen supply therein and control the temperature in the building.

16. Apparatus according to claim 15 wherein said ventilation means includes an elongate air duct overlying the series of cages with openings provided at spaced locations along the duct for directing air outwardly toward the side walls of the building to avoid undesirable air drafts in the cages.

17. Apparatus according to claim 15 wherein said ventilation means also includes temperature responsive fan means operable in response to a predetermined high temperature condition in said building for inducing a flow of fresh air into the building at one end thereof while directing air from the building at the opposite end thereof to thereby create a longitudinal flow of fresh air along the elongate building.

18. Apparatus according to claim 15 including a series of relatively small doors provided along at least one longitudinal side wall of the elongate confinement building at spaced locations alongside the series of cages and an elongate confinement barrier located exteriorly of the confinement house alongside said one longitudinal side wall and serving to facilitate herding the animals alongside the confinement house and into the house through one of said doors for ease in loading the animals into the cages.

19. A tiered cage assembly for animals, especially suited for rearing pigs, and comprising a plurality of upright supports, a plurality of cages carried by said supports and arranged in vertically spaced tiered relation to form respective upper and lower elongate series of cages, each cage comprising a floor carried by said supports and being of openwork construction to allow animal waste to pass therethrough while maintaining the animals in a dry condition, and an open-bottomed enclosure having side walls and a top wall also of openwork construction, said enclosure being restingly positioned on and supported by said floor with the floor thus serving as the bottom of the cage, said enclosure including a skeletal reinforcing frame and open mesh wire secured to the skeletal frame to define the top and sides of the enclosure, the wire being positioned exteriorly of the frame to locate any rough edges of the wire outside of the cage and shielded from contact by the animals housed therein, and said enclosure having door means providing access into the cage for removing or placing animals in the cage, respective upper and lower elongate troughs underlying said upper and lower elongate series of cages and being positioned for receiving and collecting the animal waste passing through the floors of the cages while facilitating periodic inspection of the animal waste for locating any unhealthy animals and segregating them from the healthy animals, and water supply means operably associated with a corresponding end of said upper and lower elongate troughs for periodically directing a sweeping flow of wash water along the troughs to flush away the animal waste from below the cages.

20. A tiered cage assembly according to claim 19 wherein said upright supports carrying said cages are positioned outside the cages at spaced locations along opposite sides of the upper and lower series of cages.

21. A tiered cage assembly according to claim 19 wherein said upright supports carrying said cages also engage and supportively carry said upper elongate trough.

22. A tiered cage assembly according to claim 19 wherein each of said upright supports engages and supportively carries corner portions of the respective floors of two adjacent cages in each of the upper and lower series of cages.

23. A tiered cage assembly according to claim 19 wherein said floor comprises a skeletal reinforcing frame carried by said supports, and open mesh wire overlying said skeletal frame and defining the flooring of the cage.

24. A tiered cage assembly according to claim 23 wherein said skeletal reinforcing frame includes an upstanding flange around the perimeter thereof, and wherein lowermost portions of the side walls of said enclosure are positioned inside the upstanding flange and cooperate therewith to retain the enclosure in position in resting engagement on the floor.

25. A tiered cage assembly according to claim 19 including manually actuable means positioned adjacent the corners of each of said cages for raising the enclosure upwardly out of resting engagement with the floor and for supporting the enclosure in the raised position to facilitate cleaning of the cage.

26. A tiered cage assembly according to claim 25 including drinking water supply means extending through said enclosure of each of said cages for supplying drinking water to the animals housed therein, and said drinking water supply means including a flexible connector pipe to accommodate movement of the enclosure during cleaning thereof.

27. A tiered cage assembly according to claim 19 including water supply means associated with each of said cages for supplying drinking water to the animals housed therein, and means operably associated with said water supply means for selectively providing medication in the drinking water supply to selected ones of said cages.

28. A tiered cage assembly according to claim 19 wherein said lower trough comprises a gutter formed in the supporting floor underneath the tiered cage assembly.

29. A tiered cage assembly according to claim 19 wherein said enclosure includes a partition dividing the cage into separate adjacent compartments, and wherein said door means comprises respective sliding doors providing access into each of the separate adjacent compartments of the cage.

30. A tiered cage assembly for animals, especially suited for rearing pigs, and comprising a plurality of elongate cages arranged end-to-end in vertically aligned tiered relation to form respective upper and lower elongate series of cages, each cage comprising a floor of open mesh construction to allow animal waste to pass therethrough while maintaining the animals in a dry condition, and an open-bottomed open-mesh enclosure restingly positioned on and supported by said floor with the floor thus serving as the bottom of the cage, said enclosure including a skeletal reinforcing frame and open mesh wire secured to the skeletal frame to define the top and sides of the enclosure, the wire being positioned exteriorly of the frame to locate any rough edges of the wire outside of the cage and shielded from contact by the animals housed therein, a plurality of upright cage supports arranged in longitudinally spaced pairs on opposite sides of the cages and positioned adjacent opposite ends of the respective cages in said upper and lower series, each pair of upright supports having upper and lower cage brackets extending laterally inwardly therefrom, the upper cage brackets of each pair of upright supports engaging and supporting corner portions of the respective floors of two adjacent cages in said upper series of cages and the lower cage brackets of each pair of upright supports engaging and supporting corner portions of the respective floors of two adjacent cages in said lower series of cages, an upper elongate trough carried by said upright cage supports and underlying said upper elongate series of cages, said upper trough being positioned for receiving and collecting the animal waste passing through the open mesh floors of the cages in said upper series while facilitating periodic inspection of the animal waste for locating any unhealthy animals and segregating them from the healthy animals, a lower trough underlying said lower elongate series of cages and also being positioned for receiving and collecting the animal waste passing through the open mesh floors of the lower cages while facilitating periodic inspection of the animal waste for locating any unhealthy animals and segregating them from the healthy animals, and water supply means operably associated with a corresponding end of said upper and lower elongate troughs for periodically directing a sweeping flow of wash water along the troughs to flush away the animal waste from below the cages.

31. A cage for animals, especially suited for rearing pigs, and comprising a floor of openwork construction to allow animal waste to pass therethrough while maintaining the animals in a dry condition, and an open-bottomed enclosure having side walls and a top wall also of openwork construction, said enclosure being restingly positioned on and supported by said floor with the floor thus serving as the bottom of the cage, said enclosure including a skeletal reinforcing frame and open mesh wire secured to the skeletal frame to define the top and sides of the enclosure, the wire being positioned exteriorly of the frame to locate any rough edges of the wire outside of the cage and shielded from contact by the animals housed therein, and said enclosure having door means providing access into the cage for removing or placing animals in the cage.

32. A cage according to claim 31 wherein the size of the openings in the openwork floor is substantially smaller than the size of the openings in the openwork side walls and top wall.

33. A cage according to claim 31 wherein said floor comprises a skeletal reinforcing frame and open mesh wire overlying said skeletal frame and defining the flooring of the cage.

34. A cage according to claim 33 wherein said skeletal reinforcing frame includes an upstanding flange around the perimeter thereof, and wherein lowermost portions of the side walls of said enclosure are positioned inside the upstanding flange and cooperate therewith to retain the enclosure in position in resting engagement on the floor.

35. A cage according to claim 31 including manually actuable means positioned adjacent the corners of said cage for raising said enclosure upwardly out of resting engagement with the floor and for supporting the enclosure in the raised position to facilitate cleaning of the cage.

36. A cage according to claim 31 including a feed container mounted on an exterior side wall of the cage with an opening being formed in the side wall of the cage to provide access to the feed container.

37. A cage according to claim 36 including water supply means provided on the side wall of the cage opposite said feed container and including an animal actuated water dispenser nipple for supplying drinking water to the animals housed in the cage.

38. A cage according to claim 31 wherein said enclosure includes a partition dividing the cage into separate adjacent compartments, and wherein said door means comprises respective sliding doors providing access into each of the separate adjacent compartments of the cage.

39. A cage for animals, especially suited for rearing pigs, and comprising an elongate generally rectangular floor of open mesh construction to allow animal waste to pass therethrough while maintaining the animals in a dry condition, and an open-bottomed rectangular enclosure restingly positioned on and supported by said floor with the floor thus serving as the bottom of the cage, said enclosure including an open mesh top wall of dimensions substantially corresponding to said floor, with opposing pairs of open mesh side walls extending around the perimeter of said top wall, lowermost edge portions of the side walls being restingly positioned on and supported by said floor, said enclosure having a medially located open mesh partition extending between opposite side walls and dividing the cage into a pair of adjacent compartments of similar size, and having respective doors providing access into each of the adjacent compartments of said cage for removing or placing animals therein.

40. A cage according to claim 39 wherein said respective doors providing access into each of the adjacent compartments of said cage comprise respective sliding doors mounted for sliding movement along a common side wall of said enclosure, said doors being so located in said common side wall as to be positioned in spaced relation from one another alongside the respective compartments of the cage when the doors are in closed relation, and each door being slidably positionable alongside the adjacent compartment of the cage when in opened relation.

41. A cage according to claim 40 wherein said common side wall of said enclosure includes channel means receiving respective upper and lower portions of both of said doors for sliding movement and defining a common upper and lower trackway for both of said doors.

* * * * *